United States Patent
Kamijo et al.

(10) Patent No.: US 6,371,076 B1
(45) Date of Patent: Apr. 16, 2002

(54) ENGINE COMBUSTION CONTROL APPARATUS AND METHOD

(75) Inventors: Yusuke Kamijo; Yoshiyuki Yamashita; Noboru Takagi, all of Toyota; Senji Kato; Yukikazu Ito, both of Aichi-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/636,260

(22) Filed: Aug. 10, 2000

(30) Foreign Application Priority Data

Aug. 26, 1999 (JP) .......................................... 11-239904

(51) Int. Cl.[7] .................................................. F02B 17/00
(52) U.S. Cl. ................................... 123/295; 123/406.29
(58) Field of Search ................................. 123/295, 305, 123/430, 406.29, 406.38

(56) References Cited

U.S. PATENT DOCUMENTS 5,755,198 A * 5/1998 Grob et al. ................. 123/295
5,988,137 A * 11/1999 Tamura et al. ............. 123/295
5,988,138 A * 11/1999 Kadota ....................... 123/305
6,067,956 A * 3/2000 Motose et al. ............. 123/305
6,062,189 A * 5/2000 Kaneko et al. ............. 123/295

FOREIGN PATENT DOCUMENTS

| JP | 4-353243 | 12/1992 |
| JP | 10-159642 | 6/1998 |
| JP | 10-176570 | 6/1998 |

* cited by examiner

Primary Examiner—Willis R. Wolfe
Assistant Examiner—Mahmoud Gimie
(74) Attorney, Agent, or Firm—Kenyon & Kenyon (57) ABSTRACT

An engine performs a combustion mode selected from a plurality of combustion modes. The combustion modes include stratified-charge combustion and homogeneous-charge combustion. A electronic control unit switches the combustion mode in accordance with the current running conditions of the engine. The electronic control unit limits a running area in which stratified-charge combustion is performed in accordance with the frequency of engine knocking occurrences. This properly executes knocking control without adversely affecting the execution of is stratified-charge combustion.

12 Claims, 5 Drawing Sheets

ENGINE COMBUSTION CONTROL APPARATUS AND METHOD

BACKGROUND OF THE INVENTION

The present invention relates to a combustion control apparatus and method for an engine for switching the combustion mode between a stratified-charge combustion mode and a homogeneous-charge combustion mode.

Engines that selectively perform homogeneous-charge combustion, which forms a homogeneous air-fuel mixture layer in the combustion chamber, and stratified-charge combustion, which forms a rich air-fuel mixture layer in the vicinity of the ignition plug, are known.

Such engines reduce the pumping loss and cooling loss to improve fuel efficiency, as compared with an engine that performs only homogeneous-charge combustion. In a heavy-load operation, which increases the amount of fuel injection, the combustion mode is switched to homogeneous-charge combustion from stratified-charge combustion to provide the desired engine power.

For example, in the engine disclosed in Japanese Unexamined Patent Publication (KOKAI) No. Hei 10-176570, when abnormal combustion due to self-ignition of the air-fuel mixture, or knocking, occurs, the ignition timing is retarded to suppress the maximum combustion pressure. This suppresses knocking. This control procedure is called "knocking control."

Knocking control changes the retardation of the ignition timing in accordance with the frequency of knocking occurrences. When knocking occurs frequently, the retardation of the ignition timing is increased.

In stratified-charge combustion mode, it is necessary to ignite the fuel when an air-fuel mixture layer of a predetermined concentration is formed in the vicinity of the ignition plug. The stratified-charge combustion mode has a narrower range within which the ignition timing can be changed, as compared with homogeneous-charge combustion. If the ignition timing is retarded in the stratified-charge combustion mode to suppress knocking, as in the homogeneous-charge combustion mode, the ignition timing departs from the allowable range. This degrades the combustion and sometimes results in misfires.

If the operation range of an engine that performs stratified-charge combustion is limited to a range where knocking does not occur, combustion deterioration can be avoided; however, this reduces the operation area of the engine in which stratified-charge combustion is performed, which lowers the fuel efficiency.

SUMMARY OF THE INVENTION

Accordingly, it is an object of the present invention to provide a combustion control apparatus and method for an engine which can adequately execute knocking control without adversely affecting the execution of stratified-charge combustion.

To achieve the above objective, the present invention provides an apparatus for controlling combustion in an engine that produces power by burning a mixture of air and fuel in a combustion chamber. The engine performs a mode of combustion selected from a plurality of combustion modes. The combustion modes are stratified-charge combustion, in which the mixture is distributed in a concentrated manner in the combustion chamber, and homogeneous-charge combustion, in which the mixture is distributed in a homogeneous manner in the combustion chamber. The apparatus comprises a controller for switching the combustion mode in accordance with current running conditions of the engine. The controller limits a running area in which stratified-charge combustion is selected in accordance with the occurrence of engine knocking.

To achieve the above objective, the present invention also provides a method for controlling combustion in an engine that produces power by burning a mixture of air and fuel in a combustion chamber. The engine performs a combustion mode selected from a plurality of combustion modes. The combustion modes are stratified-charge combustion, in which the mixture is distributed in a concentrated manner in the combustion chamber, and homogeneous-charge combustion, in which the mixture is distributed in a homogeneous manner in the combustion chamber. The method comprises switching the combustion mode in accordance with current running conditions of the engine, and limiting a running area of stratified-charge combustion in accordance with the frequency of engine knocking occurrences.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of this invention will now be described referring to FIGS. 1 through 5.

Figure 1:
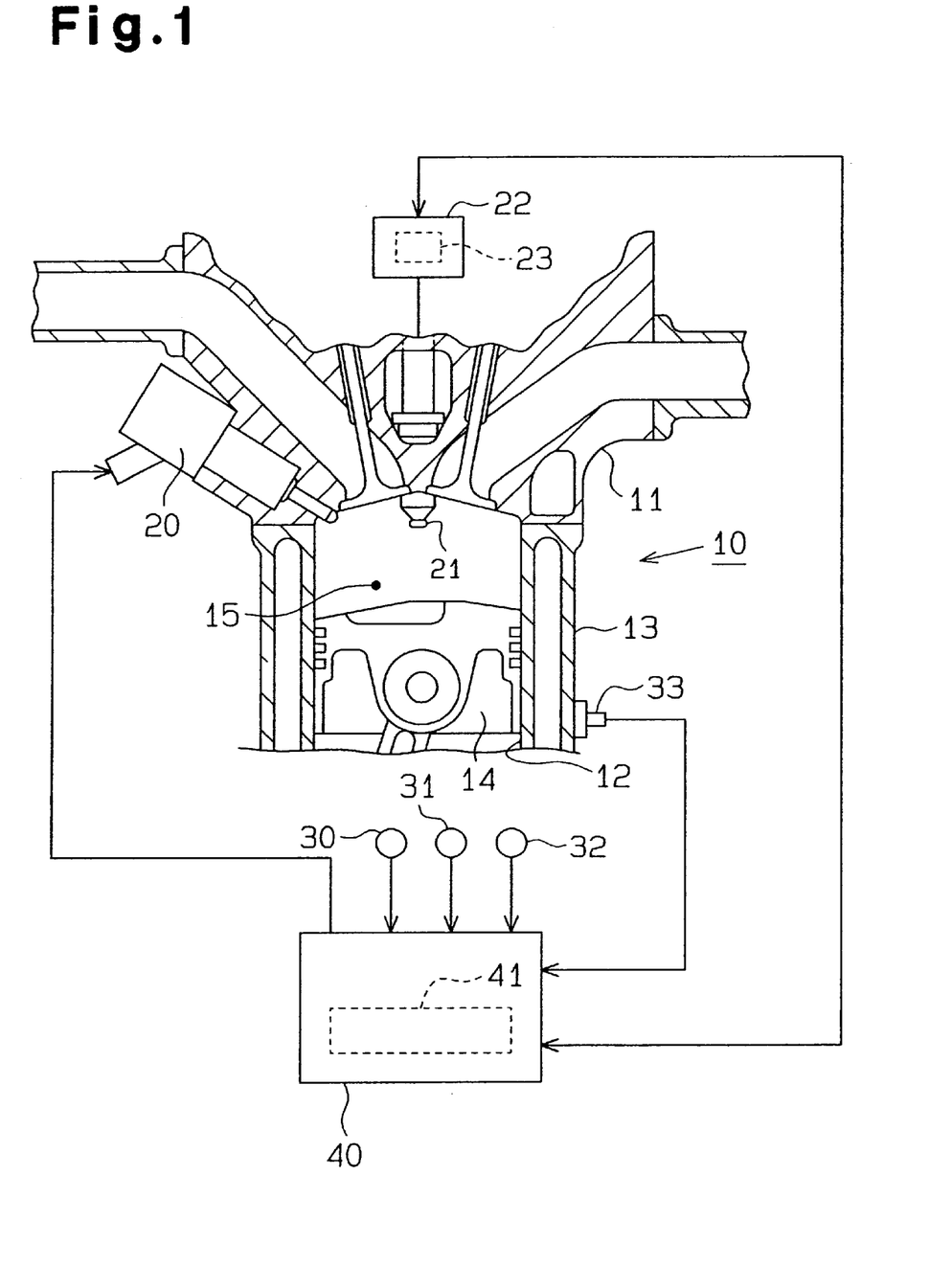
FIG. 1 is a schematic structural diagram of an engine and a combustion control apparatus according to a first embodiment of the invention.

As shown in FIG. 1, an engine 10 has a cylinder head 11 and a cylinder block 13 in which a plurality of cylinders 12 (only one shown in FIG. 1) are formed. A piston 14 is provided in each cylinder 12. The piston 14, the inner wall of the cylinder 12 and the cylinder head 11 define a combustion chamber 15.

Injectors 20, which directly inject fuel into the associated combustion chambers 15, and ignition plugs 21, which ignite the fuel injected from the associated injectors 20, are provided on the cylinder head 11 in association with the cylinders 12. Each ignition plug 21 is connected to an associated ignition coil 22. An igniter 23, which is incorporated in the ignition coil 22, adjusts the ignition timing.

The engine 10 is provided with various sensors, which detect the running conditions of the engine and the occurrence of knocking. A crank angle sensor 30 and a cam angle sensor 31 are respectively provided near the crankshaft and the cam shaft, which rotates in response to the movement of the crankshaft (neither shaft is shown). The crank angle and cam angle sensors 30 and 31 respectively detect the rotational speed of the crankshaft (engine speed NE) and the rotational phase (crank angle CA) thereof. Provided in the vicinity of an accelerator pedal (not shown), which is depressed by the driver, is a pedal position sensor 32, which detects the degree of pedal depression (pedal depression degree ACCP). Provided on the cylinder block 13 is a knock sensor 33, which outputs a signal according to the magnitude of knocking that occurs in the engine 10 (knocking signal KCS).

The signals that are output from the individual sensors 30–33 are input to an electronic control unit (ECU) 40 of the engine 10. Based on detection signals from various sensors, including the sensors 30–33 mentioned above, the ECU 40 controls the injectors 20 and the igniters 23 to control the amount of fuel injection, the fuel injection timing and the ignition timing. The ECU 40 has a memory 41 that stores programs and operational maps for executing various control procedures and data that is computed when the control procedures are being performed.

The combustion mode of the engine 10 is switched between stratified-charge combustion and homogeneous-charge combustion by the ECU 40.

When the combustion mode is switched to stratified-charge combustion, for example, the air-fuel ratio is set to a value (A/F=25 to 50) greater than the stoichiometric air-fuel ratio (A/F=14.5). Fuel is injected after the compression stroke of the piston 14. The injected fuel hits the top of the piston 14 and is splashed and unevenly distributed near the ignition plug 21, and the fuel is ignited.

When the combustion mode is switched to homogeneous-charge combustion, the air-fuel ratio is set to the stoichiometric air-fuel ratio, and fuel is injected during the suction stroke of the piston 14. As a result, the fuel, which is mixed with air approximately homogeneously, is ignited in the combustion chamber 15.

The switching of the combustion mode is performed based on parameters, such as the engine load KL and the engine speed NE, which represent the running conditions of the engine. For example, the amount of fuel injection per stroke of the piston 14, which is set based on the pedal depression degree ACCP and the engine speed NE, is used as the engine load KL.

Figure 2:
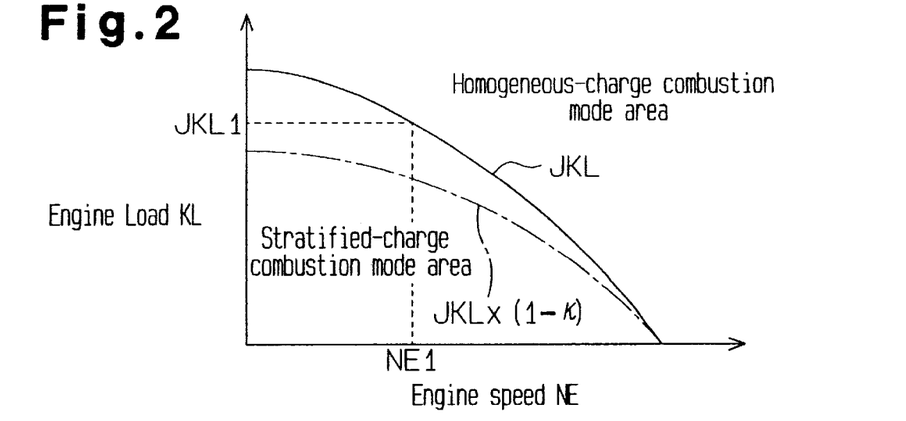
FIG. 2 is a map showing the relationship between the combustion mode and the running conditions of the engine in FIG. 1.

FIG. 2 shows a map that is used in switching the combustion mode. The ECU 40 determines the combustion mode that fits the current running conditions of the engine based on the engine load KL and engine speed NE by referring to the map in FIG. 2.

When the engine load KL is less than a decision value JKL (JKL1) corresponding to the current engine speed NE (NE1), that is, when KL<JKL1, it is determined that the present running conditions of the engine are in an area in which stratified-charge combustion should be carried out. When the engine load KL is equal to or greater than the decision value JKL (KL≧JKL1), it is determined that the running conditions of the engine lie in an area in which homogeneous-charge combustion should be performed. The relationship between the decision value JKL and the engine speed NE in the map in FIG. 2 is experimentally predetermined and is stored in the memory 41 of the ECU 40.

As mentioned above, switching the combustion mode is generally controlled based on the engine load KL and the engine speed NE. In this embodiment, switching the combustion mode is controlled further on the basis of the knocking state, which is acquired through a knocking control procedure.

The knocking control procedure and the switching of the combustion mode will now be explained.

Figure 3A:
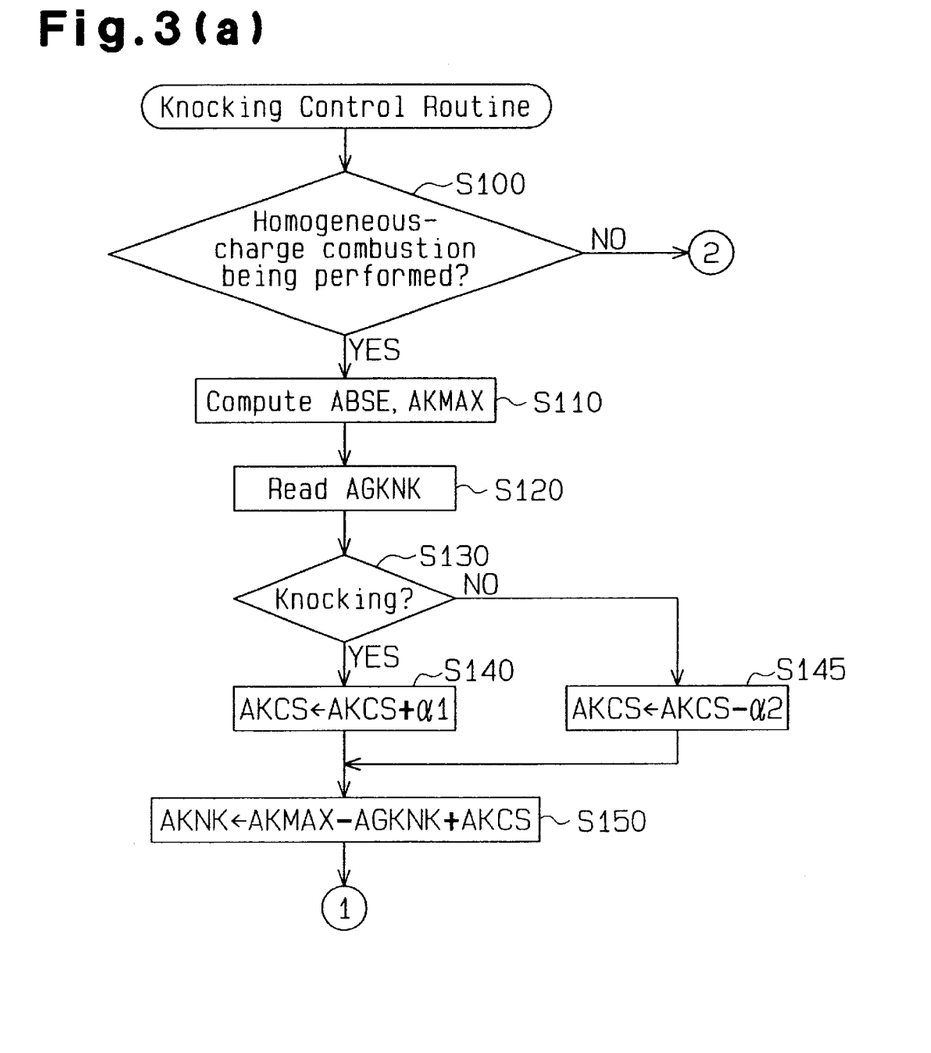
FIG. 3(A) is a flowchart illustrating a knocking control routine.
Figure 3B:
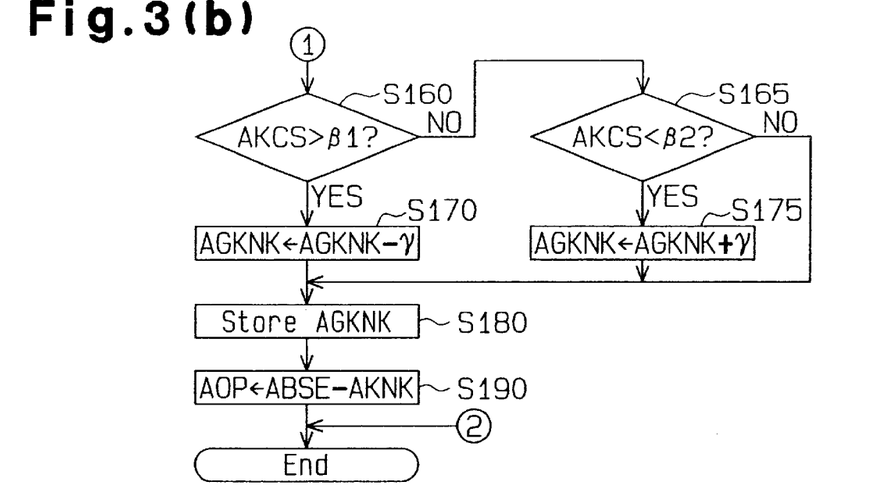
FIG. 3(B) is a flowchart illustrating the rest of the knocking control routine in FIG. 3A.

FIGS. 3(A) and 3(B) are flowcharts illustrating a knocking control routine. The ECU 40 executes the routine illustrated in the flowcharts as an interruption process, which is initiated at predetermined crank-angle intervals.

In step S100 shown in FIG. 3(A), it is determined whether the currently selected combustion mode is the homogeneous-charge combustion mode. When the current combustion mode is the stratified-charge combustion mode, the routine is temporarily terminated. That is, in this embodiment, knocking control is not performed during stratified-charge combustion. The ignition timing in stratified-charge combustion is set in another routine such that ignition is carried out when the fuel injected from the injector 20 forms an air-fuel mixture layer of a predetermined concentration near the ignition plug 21.

When it is determined that the current combustion mode is the homogeneous-charge combustion mode, however, a basic ignition timing ABSE and a maximum retarding amount AKMAX are computed based on the engine load KL and the engine speed NE in step S110.

The basic ignition timing ABSE represents the ignition timing at which the maximum engine power is provided for the current running conditions of the engine. The basic ignition timing ABSE is indicated in terms of a crank angle CA preceding a reference angle. The reference angle corresponds to the top dead center position of the compression stroke.

The maximum retarding amount AKMAX represents the maximum degree of ignition timing retardation. The maximum retarding amount AKMAX is set to a value that guarantees the suppression of knocking for the current running conditions of the engine.

The relationship of the engine running conditions with the basic ignition timing ABSE and the maximum retardation amount AKMAX (the relationship between the engine load KL and the engine speed NE) has been experimentally predetermined and is stored in the memory 41 of the ECU 40 as data for computing the basic ignition timing ABSE and the maximum retardation amount AKMAX.

In step S120, a knock learned value AGKNK is fetched from the memory 41. The knock learned value AGKNK is a value advanced from the maximum retardation amount (ABSE−AKMAX) and is obtained by subtracting the maximum retardation amount AKMAX from the basic ignition timing ABSE, in accordance with the knocking state. When occurrences of knocking are frequent, the knock learned value AGKNK is gradually reduced. When the frequency of knocking occurrences is small, on the other hand, the knock learned value AGKNK is gradually increased. Therefore, the knock learned value AGKNK reflects the frequency of knocking. The frequency of knocking varies in accordance with the octane value of the fuel and with the actual compression ratio, which is changed by adhesion of carbon to the cylinder 12.

A plurality of knock learned values AGKNK are stored in the memory 41, and each knock learned value AGKNK corresponds to a learning area that depends on the engine speed NE. When three learning areas, a low-speed area, an intermediate-speed area and a high-speed area, are set, for example, there are three knock learned values AGKNK, which respectively correspond to the three learning areas. The knock learned value AGKNK is set in accordance with the appropriate learning area because the knocking state varies according to the engine speed NE. Knock suppression is improved by reflecting the difference in the knocking state according to the engine speed NE on the ignition timing.

In step S130, whether or not the engine is knocking is determined based on the knocking signal KCS output from the knock sensor 33. When it is determined that knocking has occurred, the process goes to step S140. In step S140, a predetermined value α1 is added to a current knock control value AKCS and the resultant value (AKCS+α1) is set as a new knock control value AKCS.

The knock control value AKCS serves to correct the ignition timing in accordance with the current knocking occurrence frequency. The knock control value AKCS, like the knock learned value AGKNK, is renewed in accordance with the knocking state. While the knock learned value AGKNK is gradually updated according to the frequency of occurrence of knocking over a relatively long period of time, the knock control value AKCS is frequently updated according to the occasional occurrence of knocking.

When it is determined in step S130 that knocking has not occurred, the process goes to step S145. In step S145, a predetermined value α2 is subtracted from the current knock control value AKCS and the resultant value (AKCS−α2) is set as a new knock control value AKCS.

After the knock control value AKCS is updated in accordance with whether or not knocking is currently occurring, a final retarding amount AKNK is computed from the following equation 1 in step S150. The final retarding amount AKNK is equivalent to the final retarding amount when the basic ignition timing ABSE is retarded.

$$AKNK = AKMAX - AGKNK + AKCS \tag{1}$$

Next, the knock control value AKCS is compared with a predetermined β1 in step S160 shown in FIG. 3 (B). When it is determined that the knock control value AKCS is larger than the predetermined β1, i.e., when the knocking occurrence frequency is greater than a predetermined frequency, the process advances to step S170. In step S170, a predetermined value γ is subtracted from the current knock learned value AGKNK and the resultant value (AGKNK−γ) is set as a new knock learned value AGKNK. Then, the process goes to step S180.

When it is determined in step S160 that the knock control value AKCS is equal to or smaller than the predetermined value β1, AKCS is compared with a predetermined value β2 (β2<β1) in step S165. When it is determined that the knock control value AKCS is smaller than the predetermined value β2, i.e., when the knocking occurrence frequency is smaller than the predetermined frequency, the process advances to step S175. In step S175, the predetermined value γ is added to the current knock learned value AGKNK and the resultant value (AGKNK+γ) is set as a new knock learned value AGKNK. Then, the process goes to step S180. When the decision in step S165 is NO, or when β2≦AKCS≦β1 is satisfied, the process goes directly to step S180.

In steps S170 and S175, the knock learned value AGKNK is updated based on the size of the knock control value AKCS, which reflects the knocking occurrence frequency.

In step S180, the updated knock learned value AGKNK is stored in the memory 41 as the value of the learning area that corresponds to the current engine speed NE.

In the next step S190, the final retarding amount AKNK is subtracted from the basic ignition timing ABSE and the resultant value (ABSE−AKNK) is set as a final ignition timing AOP. After this step, this routine is temporarily terminated. The ECU 40 sends the ignition signal based on the final ignition timing AOP to the igniter 23 so that the ignition plug 21 ignites the fuel.

A combustion mode setting control procedure will now be discussed referring to FIGS. 4 and 5.

Figure 4:
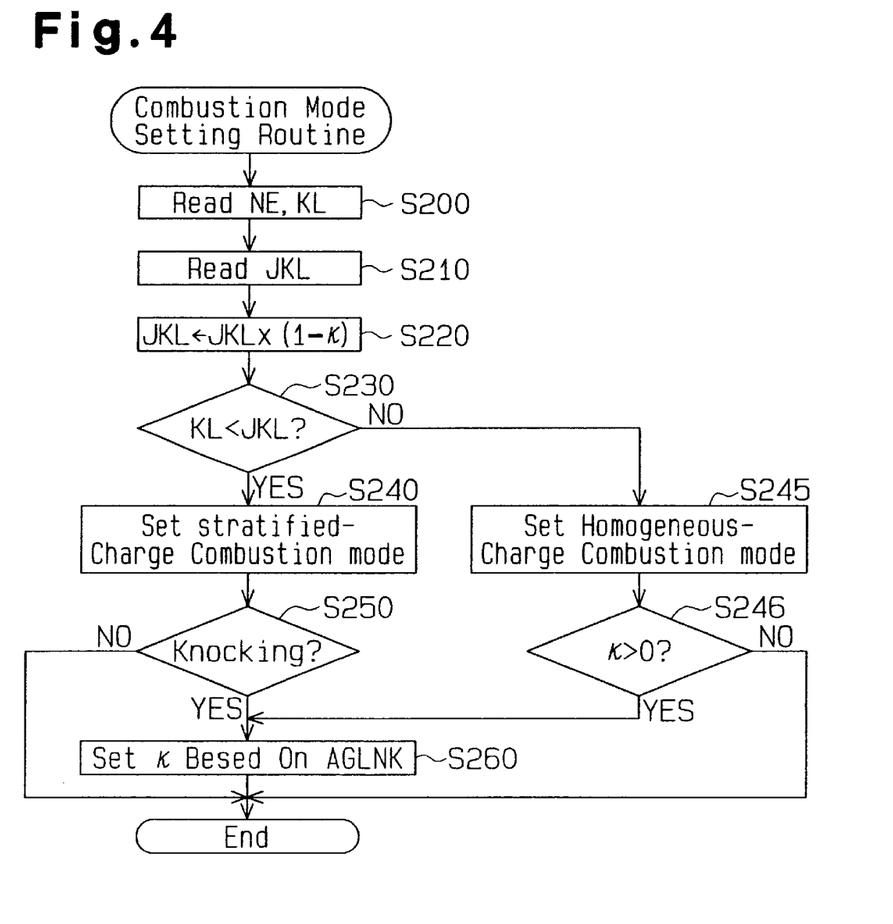
FIG. 4 is a flowchart illustrating a combustion mode setting routine.

FIG. 4 is a flowchart illustrating steps performed when switching the combustion mode. The ECU 40 executes the routine illustrated in FIG. 4 as an interruption process at predetermined crank-angle intervals.

In the first step S200, the current engine speed NE and engine load KL are fetched. Then, the decision value JKL corresponding to the engine speed NE is read from the map shown in FIG. 2 in step S210.

In the next step S220, the decision value JKL is set again according to the following equation 2.

$$JKL = JKL \times (1-\kappa) \kappa : 0 \leq \kappa < 1.0 \tag{2}$$

where κ is a reduction ratio when the stratified-charge combustion mode is reduced based on the size of the knock learned value AGKNK. The larger the reduction ratio κ is, the smaller the decision value JKL is, so that the stratified-charge combustion mode area is reduced greatly as indicated by the long and short dashed line in FIG. 2. Further, the homogeneous-charge combustion mode area is enlarged by the same amount. Note that the initial value of the reduction ratio κ is zero and the reduction ratio κ is set to a value greater than zero (but less than one) when the occurrence of knocking is detected during stratified-charge combustion.

After the resetting of the decision value JKL, the decision value JKL is compared with the current engine load KL in step S230. When it is determined in step S230 that the engine load KL is less than the decision value JKL, the process goes to step S240. When it is determined in step S240 that the running conditions of the engine lie in the stratified-charge combustion mode area, the combustion mode is set to stratified-charge combustion.

In the subsequent step S250, it is determined based on the knocking signal KCS if knocking is occurring. When no knocking is occurring in step S250, this routine is temporarily terminated. If no knocking occurs in stratified-charge combustion, therefore, the reduction ratio κ is kept at the initial value of zero. In this case, the decision value JKL is not reset to a smaller value based on the equation 2, so that the stratified-charge combustion mode area is not reduced.

When knocking is occurring in step S250, on the other hand, the process goes to step S260 where the reduction ratio κ is set based on the knock learned value AGKNK of the learning area that corresponds to the current engine speed NE.

Figure 5:
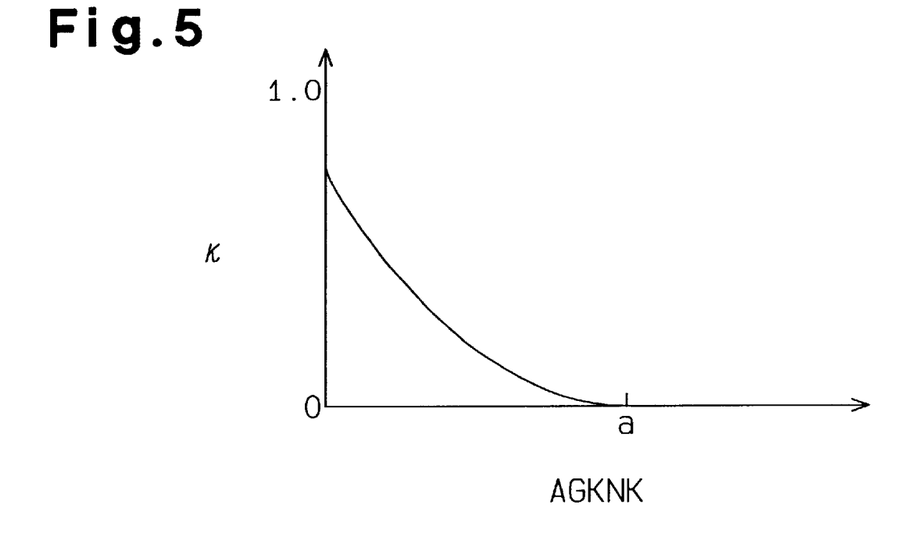
FIG. 5 is a map showing the relationship between the reduction ratio and a knock learned value in a stratified-charge combustion mode area.

FIG. 5 is a map showing the relationship between the reduction ratio κ and the knock learned value AGKNK. The smaller the knock learned value AGKNK is, the greater the reduction ratio κ is.

When the knock learned value AGKNK is small, the engine 10 is likely to knock due to, for example, the use of low octane fuel. Therefore, knocking is inevitable if stratified-charge combustion is performed in the high-load, high-speed engine running area (for example, the area near the solid line in FIG. 2).

If the ignition timing is retarded under the knocking control procedure during stratified-charge combustion, as is done in homogeneous-charge combustion, to suppress knocking, the ignition timing would be further retarded from the range where proper combustion occurs. This may result in misfire.

According to this embodiment, therefore, the smaller the knock learned value AGKNK is, i.e., the greater the knocking occurrence frequency, the greater the reduction ratio K is set. Consequently, the engine running area where stratified-charge combustion is carried out is reduced significantly and the range in which the ignition timing can be changed becomes greater in the homogeneous-charge combustion mode than in the stratified-charge combustion mode. The area for the homogeneous-charge combustion mode is increased by the same amount.

As shown in FIG. 5, when the knock learned value AGKNK is greater than a predetermined value a, the engine 10 is unlikely to be knocking. The reduction ratio K is therefore set to the initial value, or zero. In this case, therefore, the stratified-charge combustion mode area and the homogeneous-charge combustion mode area are returned to their initial states.

The reduction ratio K is stored in the memory 41 of the ECU 40. When knocking is detected during stratified-charge combustion, the reduction ratio K is set to a value other than the initial value. In the next control cycle, the combustion mode is set based on the decision value JKL that has been reset in accordance with the reduction ratio K. At this time, the combustion mode is switched to homogeneous-charge combustion from stratified-charge combustion, unless the running conditions of the engine have remained unchanged from those of the previous control cycle.

When it is determined in step S230 that the engine load KL is equal to or greater than the decision value JKL, the running conditions of the engine are considered to lie in the homogeneous-charge combustion mode area, and the combustion mode is set to homogeneous-charge combustion in step S245.

Further, it is determined in step S246 whether the reduction ratio K is larger than zero, i.e., if the stratified-charge combustion mode area has been reduced from the initial state. When it is determined that the reduction ratio K is larger than zero and thus the stratified-charge combustion mode area has been reduced, the process advances to step S260. In step S260, the reduction ratio K is set based on the current knock learned value AGKNK, and the new reduction ratio K is stored in the memory 41.

As apparent from the above, the reduction ratio K is updated even in homogeneous-charge combustion when the stratified-charge combustion mode area is reduced from the initial state. When the knock learned value AGKNK is increased due to switching to a higher octane fuel, therefore, the reduction ratio K is reduced according to the octane increase. As a result, even when knocking is detected during stratified-charge combustion and the stratified-charge combustion mode area is temporarily reduced, the stratified-charge combustion mode area will be increased again toward the initial state if the state of the engine 10 is shifted to the area where knocking is unlikely to occur.

As mentioned above, since the value of the knock learned value AGKNK varies from one of the learning areas, which are set according to the engine speed NE, to another, a change in the engine speed NE by a certain degree causes the reduction ratio K to be set to a value corresponding to a different learning area.

After the reduction ratio K is set in step S260 or when it is determined in the homogeneous-charge combustion mode that the stratified-charge combustion mode area has not been reduced (reduction ratio K=0, NO in step S246), this routine is temporarily terminated.

The combustion control apparatus according to this embodiment has the following advantages.

The operation of the engine 10 in stratified-charge combustion is restricted based on the knocking state of the engine 10. When it is necessary to significantly retard the ignition timing to suppress the occurrence of knocking, therefore, the combustion mode can be set to the homogeneous-charge combustion mode, the range of which for changing the retardation of the ignition timing is wider than that of the stratified-charge combustion mode. Since the combustion mode is switched in accordance with the knocking state, it is unnecessary to change the stratified-charge combustion mode area to an area where knocking does not occur. This permits the ignition timing to be retarded by the degree needed in the knocking control procedure.

When knocking is detected in the stratified-charge combustion mode, the combustion mode is switched to the homogeneous-charge combustion mode. This allows the ignition timing to be retarded by the degree determined by the knocking control procedure. If knocking is not detected in the stratified-charge combustion mode, the stratified-charge combustion mode area is not reduced and the combustion mode is not changed. This provides more opportunities for performing stratified-charge combustion, which improves fuel efficiency.

The stratified-charge combustion mode is changed to the homogeneous-charge combustion mode by reducing the stratified-charge combustion mode area based on the reduction ratio K, which is acquired from the knock learned value AGKNK, and the reduction ratio K is stored and held in the memory. As a result, the reduction of the stratified-charge combustion mode area based on the reduction ratio K continues, and the stratified-charge combustion mode is always determined by the knocking state. It is therefore unnecessary to make occasional changes to the combustion mode according to the knocking state, which prevents frequent changes to the combustion mode.

The reduction ratio K is set based on the knock learned value AGKNK, which is renewed during homogeneous-charge combustion. This ensures proper determination of the stratified-charge combustion mode area and the homogeneous-charge combustion mode area in accordance with the knocking state. This properly determines the timing retardation amount according to the demands of the knocking control procedure.

The reduction ratio K is updated even during homogeneous-charge combustion if the stratified-charge combustion mode area is reduced from the initial state. When the knock learned value AGKNK is increased due to, for example, a change in the fuel octane level, therefore, the reduction ratio K is reduced accordingly. This provides more opportunities to execute stratified-charge combustion to improve fuel efficiency.

A knock learned value AGKNK is provided for each of a number of learning areas, which are defined in accordance with different engine speeds NE. When the engine speed NE is changed by a certain amount, therefore, the reduction ratio K is adequately set to a value corresponding to the learning area of the new engine speed. Therefore, if the knocking state differs according to the engine speed NE, the difference due to a variation in the engine speed NE is reflected when setting each combustion mode area based on the reduction ratio K.

A second embodiment shown in FIG. 6 will now be discussed, focusing on the differences between this embodiment and the first embodiment shown in FIGS. 1 to 5.

The second embodiment differs from the first embodiment shown in FIGS. 1 to 5 in the following points. First, even in stratified-charge combustion mode, knocking control is carried out as done in homogeneous-charge combustion mode. Secondly, the knock learned value AGKNK is computed through knocking control in stratified-charge combustion mode. Thirdly, when the knock learned value AGKNK that is needed in stratified-charge combustion reaches the lower limit, the combustion mode is switched to the homogeneous-charge combustion mode from the stratified-charge combustion mode.

The knocking control routine of this embodiment will now be explained with reference to the flowcharts of FIGS. 3A and 3B. In this embodiment, the decision as to whether or not the current combustion mode is the homogeneous-charge combustion mode (step S100) is omitted. Therefore, a series of processes starting at step S110 is performed, regardless of the combustion mode that is currently selected.

In step S110, the basic ignition timing ABSE and the maximum retarding amount AKMAX are computed based on the currently selected combustion mode in addition to the engine load KL and the engine speed NE.

In step S120, the knock learned value AGKNK stored in the memory 41 is fetched. According to this embodiment, even in the stratified-charge combustion mode, the knock learned value AGKNK is updated for each of plural learning areas that are defined according to the engine speed NE (These learning areas are different from the learning areas used in the homogeneous-charge combustion mode) and the updated knock learned value AGKNK is stored in the memory 41, as is done in the homogeneous-charge combustion mode. When fetching the knock learned value AGKNK in step S120, therefore, the engine speed NE and the combustion mode currently selected are referred to.

Thereafter, steps S130 to S190 are performed as in the first embodiment.

Note that whenever it is necessary to distinguish the knock learned value AGKNK in homogeneous-charge combustion mode from that in stratified-charge combustion mode, the knock learned value AGKNK in homogeneous-charge combustion mode is denoted by AGKNKS and the knock learned value AGKNK in stratified-charge combustion mode is denoted by AGKNKT in the following description.

Figure 6:
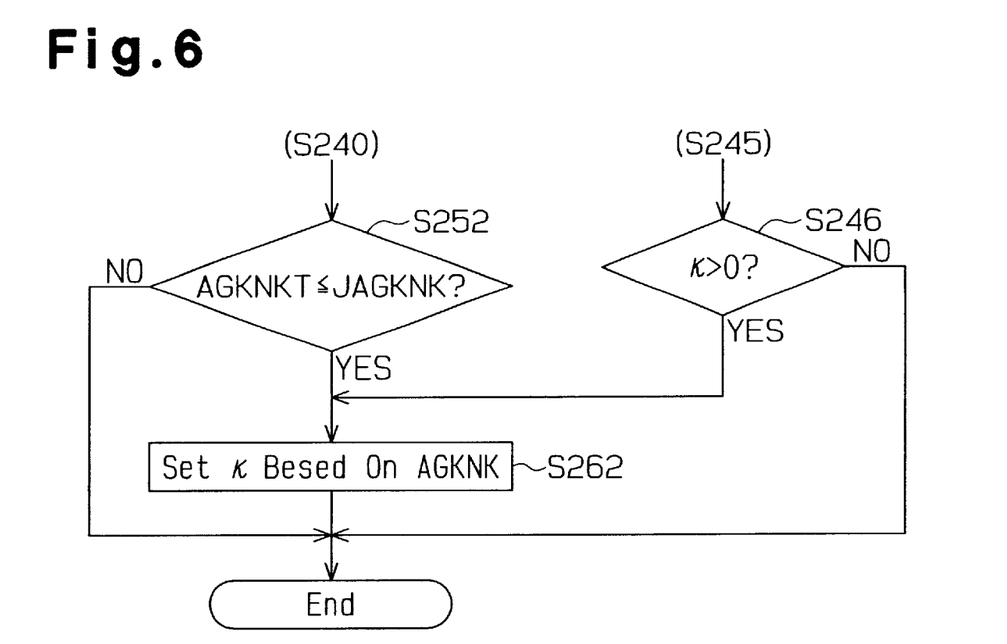
FIG. 6 is a flowchart illustrating a combustion mode setting routine according to a second embodiment.

In the combustion mode setting control of the second embodiment, the processes in steps S250 and S260 in the flowchart of FIG. 4 of the first embodiment differ from those in corresponding steps S252 and S262 as shown in FIG. 6.

As illustrated in the flowchart of FIG. 6, after the combustion mode is set to the stratified-charge combustion mode in step S240 in FIG. 4, the process goes to step S252 in the second embodiment. In step S252, the knock learned value AGKNKT in the stratified-charge combustion mode is compared with a decision value JAGKNK.

Since the range where the ignition timing can be changed is limited in the stratified-charge combustion mode, as compared with that in the homogeneous-charge combustion mode, there is a limit to the retardation of the ignition timing (final ignition timing AOP) that is accomplished by reducing the knock learned value AGKNKT. If the demanded timing retardation amount is large, a misfire may occur. To avoid such a misfire, the decision value JAGKNK is set to the lower limit at the time of changing the knock learned value AGKNKT. When the knock learned value AGKNKT in stratified-charge combustion mode is greater than the decision value JAGKNK, it is possible to maintain the proper engine combustion without causing a misfire. A map that represents the relationship between the decision value JAGKNK and the running conditions of the engine (e.g., the engine load KL and the engine speed NE) is stored in the memory 41 of the ECU 40. The decision value JAGKNK is computed by referring to this map.

When the knock learned value AGKNKT in stratified-charge combustion mode is greater than the decision value JAGKNK in step S252, this routine is temporarily terminated. When it is determined in step S252 that the knock learned value AGKNKT is equal to or smaller than the decision value JAGKNK, the process goes to step S262. In step S262, the knock learned value AGKNKS in homogeneous-charge combustion mode is fetched from the memory 41 and the reduction ratio K is set based on this knock learned value AGKNKS. As a result, the combustion mode is switched to the homogeneous-charge combustion mode from the stratified-charge combustion mode unless the running conditions of the engine have remained unchanged from those of the previous control cycle. Note that the relationship between the knock learned value AGKNKS and the reduction ratio K, which is similar to that shown in FIG. 5, has been experimentally predetermined and is stored in the memory 41.

When it is determined in step S246 that the stratified-charge combustion mode area is reduced from the initial state in the homogeneous-charge combustion mode, the reduction ratio K is set based on the knock learned value AGKNKS in the homogeneous-charge combustion mode and the reduction ratio K is updated according to the current knocking state in step S262.

According to this embodiment, the combustion mode is changed to the homogeneous-charge combustion mode from the stratified-charge combustion mode if the knock learned value AGKNKT in stratified-charge combustion mode is equal to or smaller than the decision value JAGKNK, i.e., if the knocking occurrence frequency is equal to or greater than a predetermined value. When the occurrence of knocking is detected, therefore, the combustion mode is changed to the homogeneous-charge combustion mode from the stratified-charge combustion mode only when a demand for the retardation amount of the ignition timing becomes larger through knocking control so that degradation of combustion in the stratified-charge combustion mode is likely to occur.

According to this embodiment, as described above, reducing the stratified-charge combustion mode area is performed if the knock learned value AGKNKT in the stratified-charge combustion mode has reached the lower limit (decision value JAGKNK). Therefore, more opportunities for selecting the stratified-charge combustion mode occur in the second embodiment than in the first embodiment, so that the fuel efficiency is improved as much as possible.

The above-described embodiments may be modified as follows.

Figure 7:
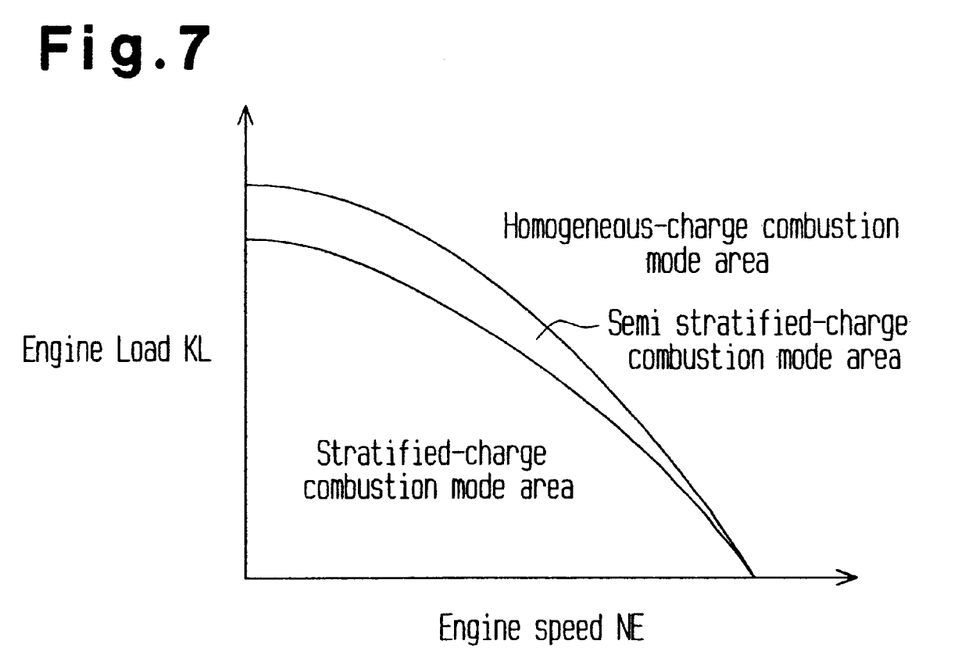
FIG. 7 is a map showing the relationship between the combustion mode and the running conditions of the engine according to a third embodiment.

As in a third embodiment, represented by FIG. 7, for example, the combustion modes may include a combustion mode having a lower degree of stratification (called a "semi stratified-charge combustion mode") in addition to the stratified-charge combustion mode and the homogeneous-charge combustion mode. In the semi stratified-charge combustion mode, fuel injection can be carried out, for example, during the suction stroke of the piston 14 and after the compression stroke. This makes the difference in fuel concentration between a location near the ignition plug 21 and other locations smaller than that of the stratified-charge combustion mode.

When the stratified-charge combustion mode area is reduced, the semi stratified-charge combustion mode area is also reduced. When each combustion mode area is reduced, it is possible to set the reduction ratio to the same value or different values between the stratified-charge combustion mode and the semi stratified-charge combustion mode.

Further, another map in which the stratified-charge combustion mode area is smaller than that in the normal state (e.g., the area shown in the map in FIG. 2) may be prepared in advance so that the map being used is changed from a normal state map to this additional map when the stratified-charge combustion mode area is reduced. In this case, the map for determining the combustion mode is set back to the normal state map when the knock learned value AGKNKS in homogeneous-charge combustion mode becomes equal to or greater than the predetermined value.

Step S246 in FIGS. 4 and 6 may be omitted so that the process is terminated after step S245. The process of updating the reduction ratio K during homogeneous-charge combustion may be omitted. In this case, the reduction ratio K may be reset to the initial value of zero when the engine 10 stops running.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An apparatus for controlling combustion in an engine that produces power by burning a mixture of air and fuel in a combustion chamber, wherein the engine performs a mode of combustion selected from a plurality of combustion modes, the combustion modes being stratified-charge combustion, in which the mixture is distributed in a concentrated manner in the combustion chamber, and homogeneous-charge combustion, in which the mixture is distributed in a homogeneous manner in the combustion chamber, wherein the apparatus comprises:
   a controller for switching the combustion mode to stratified-charge combustion when the running area and switching the combustion mode to homogeneous-charge combustion when the running area of the engine is outside the stratified-charge combustion running area; and
   a detector for detecting knocking; wherein the controller includes:
   means for retarding the ignition timing to suppress knocking in accordance with the value detected by the detector; and
   means for reducing the stratified-charge combustion running area to limit the stratified-charge combustion in accordance with the value detected by the detector.

2. The apparatus according to claim 1, wherein the reducing means reduces the stratified-charge combustion running area and changes the combustion mode from stratified-charge combustion to homogeneous-charge combustion when the detector detects knocking during stratified-charge combustion.

3. The apparatus according to claim 1, wherein the controller further includes means for judging whether the value of the frequency of occurrence of knocking is equal to or greater than a predetermined value during stratified-charge combustion in accordance with the value detected by the detector, and wherein the reducing means reduces the stratified-charge combustion running area and changes the combustion mode from stratified-charge combustion to homogeneous-charge combustion when the frequency of occurrence of knocking is equal to or greater than the predetermined value.

4. The apparatus according to claim 2, wherein the reducing means memorizes the reduced running area.

5. The apparatus according to claim 3, wherein the reducing means memorizes the reduced running area.

6. The apparatus according to claim 4, wherein the reducing means stores the frequency of knocking occurrences during homogeneous-charge combustion in accordance with the value detected by the detector and sets a reduction ratio, which is used to reduce the stratified-charge combustion running area in accordance with the stored knocking frequency.

7. The apparatus according to claim 6, wherein, when the stratified-charge combustion running area is reduced, the reduction ratio is always updated.

8. The apparatus according to claim 5, wherein the reducing means stores the frequency of knocking occurrences during homogeneous-charge combustion in accordance with the value detected by the detector and sets a reduction ratio, which is used to reduce the stratified-charge combustion running area in accordance with the stored knocking frequency.

9. The apparatus according to claim 8, wherein, when the stratified-charge combustion running area is reduced, the reduction ratio is always updated.

10. The apparatus according to claim 1, wherein the combustion modes further include semi-stratified-charge combustion, which has characteristics of both stratified-charge combustion and homogeneous-charge combustion, wherein the controller switches the combustion mode to semi-stratified-charge combustion when the running area of the engine is within the semi-stratified-charge combustion running area, and wherein the reducing means reduces the semi-stratified-charge combustion in accordance with the value detected by the detector.

11. A method for controlling combustion in an engine that produces power by burning a mixture of air and fuel in a combustion chamber, wherein the engine performs a combustion mode selected from a plurality of combustion modes, the combustion modes being stratified-charge combustion, in which the mixture is distributed in a concentrated manner in the combustion chamber, and homogeneous-charge combustion, in which the mixture is distributed in a concentrated manner in the combustion chamber, and homogeneous-charge combustion, in which the mixture is distributed in a homogeneous manner in the combustion chamber, wherein the method comprises:
   switching the combustion mode to stratified-charge combustion when the running area of the engine is within the stratified-charge combustion running area and switching the combustion mode to homogeneous-charge combustion when the running area of the engine is outside the stratified-charge combustion running area;
   detecting knocking;
   retarding the ignition timing to suppress knocking in accordance with the value of the detected knocking; and
   reducing the stratified-charge combustion running area to limit the stratified-charge combustion in accordance with the value of the detected knocking.

12. A method for controlling combustion in an engine that produces power by burning a mixture of air and fuel in a combustion chamber, wherein the engine performs a combustion mode selected from a plurality of combustion modes, the combustion modes being stratified-charge combustion, in which the mixture is distributed in a concentrated manner in the combustion chamber, and homogeneous-charge combustion, in which the mixture is distributed in a homogeneous manner in the combustion chamber, wherein the method comprises;

switching the combustion mode to stratified-charge combustion when the running area of the engine is within the stratified-charge combustion running area and switching the combustion mode to homogeneous-charge combustion when the running area of the engine is outside the stratified-charge combustion running area;

detecting knocking;

judging whether the value of the frequency of occurrence of knocking is equal to or greater than a predetermined value during stratified-charge combustion in accordance with the value of the detected knocking;

retarding the ignition timing to suppress knocking in accordance with the value of the detected knocking; and reducing the stratified-charge combustion running area to limit the stratified-charge combustion and changing the combustion mode from stratified-charge combustion to homogeneous-charge combustion when the frequency of occurrence of knocking is equal to or greater than the predetermined value.

* * * * *